United States Patent [19]

Evans

[11] 4,346,787
[45] Aug. 31, 1982

[54] ENERGY RECOVERY DEVICE
[75] Inventor: Vernon Evans, Kinnelon, N.J.
[73] Assignee: ERD, Inc., Fairfield, N.J.
[21] Appl. No.: 148,554
[22] Filed: May 9, 1980
[51] Int. Cl.$^3$ .............................. F03G 1/00; F16F 1/06
[52] U.S. Cl. ...................................... 185/37; 16/1 C; 248/292.1; 267/155
[58] Field of Search .............................. 74/97; 16/1 C; 248/292.1; 267/155; 185/37

[56] References Cited
U.S. PATENT DOCUMENTS

| | | | |
|---|---|---|---|
| 2,549,128 | 4/1951 | Pfeiffer | 16/1 C X |
| 2,624,265 | 1/1953 | Mader | 74/97 X |
| 2,656,563 | 10/1953 | Jones | 16/1 C X |
| 2,742,662 | 4/1956 | Lyons | 267/155 X |
| 3,851,810 | 12/1974 | Jespersen | 185/37 X |

Primary Examiner—Allan D. Herrmann
Attorney, Agent, or Firm—Pennie & Edmonds

[57] ABSTRACT

The energy recovery device includes a housing having a central shaft which is connected to a lever operating a work-load system capable of generating work-load forces. The central shaft is also connected to a disk having four posts generally parallel to the shaft and initially located at positions corresponding to the four major points of a compass. Within each corner of the housing, a helically coiled spring is positioned over a support post. Each spring has two extending arms which contact two respective adjacent posts on the disk so as to maintain the spring under tension. When the lever is at the neutral position, i.e., when no work-load forces are generated, the recovery forces generated by the four springs within the housing are generally balanced. As the lever is displaced from the neutral position by a driving force, the disk rotates whereby the angular displacement between the arms of any spring decreases. Once the disk is displaced, the spring forces aid in continuing displacement of the disk. Simultaneously the work-load system generates forces which oppose any displacement. The springs are preferably configured and dimensioned so that, at any given displacement of the lever from the neutral position, the recovery forces generally counterbalance the work-load forces. Thus the lever will remain at a given displacement when the driving force applied to the lever is removed. Additionally, the counterbalancing of forces permits continued displacement of the lever with a minimal and constant driving force.

17 Claims, 5 Drawing Figures

ENERGY RECOVERY DEVICE

TECHNICAL FIELD

This invention relates to a mechanical energy storage and delivery device intended to reduce the input energy requirements of actuating means in work-load systems, in which opposing forces increase with displacement.

BACKGROUND ART

In certain types of work-load systems wherein the system is advanced through progressive or continuous displacements, forces are generated in opposition to the displacement itself. Generally, an input force is required to operate on the system so as to effect a displacement of the system or a component thereof. Frictional forces which are always present at least to some degree are not germane to the system of major forces being treated and therefore will be set aside as parasitic effects.

One example of a work-load system is the movement of an elevator panel on an airplane wing. As the elevator is raised from its normally flat position relative to the surface of the wing, the resistance offered by the flowing air mass increases with increasing displacement of the elevator. This is so since the reactive or resistance forces are proportional to the total cross-sectional surface area of the elevator presented against the flowing air mass. Frequently, the reactive forces generated on elevators are so great that hydraulic systems are necessary just to aid in the displacement of the elevator. However, even with force enabling hydraulic systems, the work output required increases with increasing displacement. During the return stroke, however, the stored energy is dissipated in a braking effort.

Since any reactive force can be represented by a spring or combinations thereof which upon displacement from their neutral or uncompressed states offer opposition to increased displacement, the discussion herein will be directed to spring systems by way of example and not limitation. In such cases, the greater the displacement, the greater the reactive force. Using the spring analogy the work-load system is said to have a positive spring "rate."

There are known devices which are intended to produce constant energy outputs. One such device is disclosed in U.S. Pat. No. 3,646,832 which relates to an energy control apparatus for automatically controlling the elastic energy of a coiled spring so that its resilience remains substantially constant. The embodiment as illustrated in FIG. 1 therein includes an operation lever pivotally supported on a shaft and having a segmental gear which meshes with a segmental gear on a pivotal member. A coiled spring is mounted on the shaft. The spring has one end portion engaging an eccentric cam on a lever and the other end portion engaging a roller mounted on the pivotal member. As the operation lever is moved, the angle $\phi$ formed by the two end portions varies. However, the difference between the angle $\phi$ before displacement of the lever and after is statedly smaller than in prior art arrangements. Hence, no significant increase is caused in the resilience of the spring. In the embodiment shown in FIG. 2, therein the spring has one end engaging a pin on a lever and the other end engaging a pivotal member pivotally supported by a shaft on which the lever is also pivotally supported. The pivotal member has a first segmental gear which meshes with a second segmental gear on a gear member. The latter also has a third segmental gear meshing with a fourth segmental gear on the lever. The ratio of the radius of rotation of the fourth gear to that of the third gear differs from the ratio for the first and second gears. Thus, proper selection of the values of the two ratios allegedly provides that the resilience of the spring will undergo substantially no change despite pivotal movement of the lever.

Notwithstanding the improvement offered by the apparatus of U.S. Pat. No. 3,646,832, this apparatus does not provide for energy storage and retrival during a typical cycle of a work-load system. Also, no recovery forces are obtainable to counterbalance forces generated by a work-load system so as to permit placement of the work-load system in a stationary position relative to the neutral position and to permit relative ease of continued displacement. For this reason, the system once displaced will not remain stationary in the displaced state but rather will tend to return to a former displacement.

Other spring systems which provide a constant force output include the Neg'ator spring manufactured by the Hunter Spring Co. and disclosed in U.S. Pat. Nos. 2,609,191; 2,609,192; 2,609,193; and 2,647,743. The Neg'ator extension spring is a roll of formed strip spring material which exerts a substantially constant restraining force to resist uncoiling. Although the Neg'ator spring is useful when employed to offset "constant force" work load systems, such as, for example, a gravitational system, it would not be suited to a work load system in which the load increases with displacement from a given starting position. Moreover, the Neg'ator is limited in size and material and is not generally applicable to large force systems.

In both spring applications described above an essentially zero spring rate has been achieved, meaning that the force delivered in opposing a work load system remains essentially constant throughout the displacement of the system.

Applying either a zero spring rate or a conventional positive spring rate arrangements to systems such as in aircraft controls, marine steering, etc, where the work loads increase with displacement (e.g., linearly with increased displacement) would only tend to compound the problem since additional input forces would be required with no savings in the net energy input.

DISCLOSURE OF INVENTION

I have invented an energy recovery device which captures the energy stored in a work-load system while it returns from the compressed state toward its neutral position and then delivers this energy as an aid to the input energy source during any subsequent displacement of the system away from the neutral position. The energy recovery device of the present invention provides a substantial reduction in the energy requirement in any given reactive force system, which translates into better energy management as well as cost savings and even weight savings, where that factor may be important, in the energy input mechanism of the actuating means. The energy recovery device can be configured as an add-on package, coupled to the actuating means in a work-load system, or it can be integrated into the design of the actuating means. The device can further be configured for angular displacement systems or for linear displacement systems without in any way changing the principle of operation.

The energy recovery device has a negative spring rate such that the force output, increasing from zero at the neutral position of the work-load system to a maximum at the farthest point of displacement, is always in the direction aiding displacement. Therefore, returning to the neutral position requires an input of energy into the energy recover device which, in the spring analogy, is stored in the reactive springs urging the system back to its neutral position.

Thus, the energy recovery not only serves to counterbalance the reactive force generated by a work-load system but will also store the reactive energy so as to permit the use of a negligible force for displacement of the work-load system.

The device of the present invention can be configured in size so as to have any desired proportion to the work-load system, and further, to have no finite limit in its energy storage capacity imposed by constraints of design or materials of construction not already associated with the work-load system itself.

According to the present invention, a device for storage and retrieval of energy during displacement of a work-load system under an input force, the work-load system generating load forces increasing in correspondence with increased displacement of the work-load system from a neutral state wherein the load forces are approximately zero, comprises plate means, first means for transferring the load forces generated by the work-load system to the plate means so as to provide displacement of the plate means in accordance with the load forces, energy storage means capable of generating forces in opposition to the load forces, and second means for transferring the forces generated by the energy storage means to the plate means in opposition to the load forces transferred to the plate means so as to aid in the displacement of the work-load system from its neutral state, and for transferring forces generated by the work-load system to the energy storage means for storage during displacement of the work-load system toward its neutral state.

The forces generated by the energy storage means are preferably capable of counteracting the load forces so as to aid in the displacement of the work-load system from its neutral state with a substantially negligible input force and to allow the work-load system to remain displaced from the neutral state upon any predetermined displacement.

In a preferred embodiment, a device for storage amd retrieval of energy during displacement of a work-load system under an input force, the work-load system generating load forces increasing in correspondence with increased displacement of the work-load system from a neutral state wherein the load forces are approximately zero, comprises a plate member, first means for transferring the load forces generated by the work-load system to the plate member so as to provide displacement of the plate member in accordance with the load forces, at least one torsion spring capable of being placed under tension and being dimensioned and configured so as to be able to generate forces in opposition to the load forces, and second means for transferring the forces generated by the torsion spring when placed under tension to the plate member in opposition to the load forces transferred to the plate member to generally counteract the load forces so as to aid in the displacement of the work load system from its neutral state with a substantially negligible input force and to allow the work-load system to remain displaced from the neutral state upon any predetermined displacement, and for transferring the load forces generated by the work-load system to the energy storage means for storage during displacement of the work-load system toward its neutral state.

According to one embodiment of the present invention, the plate member is generally a disk having at least one surface and a rod-like member extending through central portion of the disk. The first transferring means is coupled to the rod-like member so as to rotationally transfer the load forces to the plate member such that the load forces are transferred to the plate member as a torque about the rod-like member. The disk has a plurality of contact posts extending from the surface of the disk and being disposed adjacent the periphery of the disk and symmetrically about the rod-like member. The second transferring means comprises a housing for rotationally securing the disk thereto. The housing has at least one surface oriented in the direction of the disk surface and has an aperture into which the rod-like member extends. The housing further includes a plurality of support posts extending from the housing surface generally parallel to the rod-like member. The support posts are disposed adjacent the periphery of the disk and symmetrically about the rod-like member. A plurality of torsion springs corresponding in number to the plurality of support posts are each secured to at least one of the support posts. Each of the torsion springs has a pair of legs, each pair of the legs being placed in contacting engagement with a respective adjacent successive pair of contact posts on the disk such that upon rotational movement of the disk the length of one of the legs from the support post to the contact post decreases while the corresponding length of the other of the legs increases so as to create a spring force about the rod-like member. The resultant of the spring forces generated by the plurality of torsion springs is approximately equal to the load forces transferred to the plate member so as to counteract and balance the load forces.

In a second embodiment of the present invention, the plate member is a generally rectangular member which by means of a centrally positioned rod-like member and a first transferring means receives longitudinal forces so as to effect linear displacement of the rectangular member along its longitudinal axis. As with the first embodiment, the second embodiment includes a plurality of torsion springs which are positioned adjacent the rectangular member to generate linear forces acting along the longitudinal axis of the rectangular member so as to counteract and balance any load forces.

BRIEF DESCRIPTION OF DRAWINGS

The present invention is described in detail below with reference to the drawings in which.

BEST MODE FOR CARRYING OUT THE INVENTION

Figure 1:
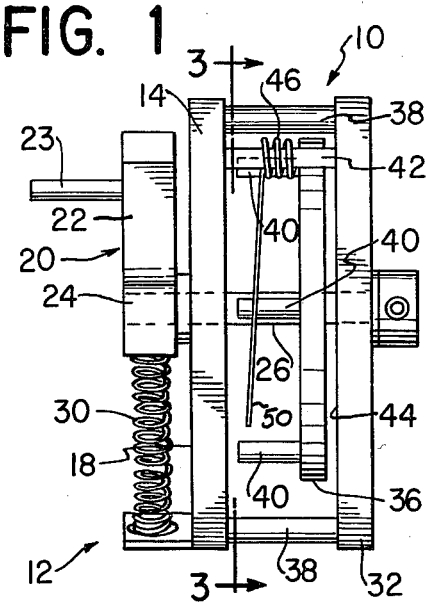
FIG. 1 is a side view of a diagrammatic and schematic representation of a work-load system and a first embodiment of an energy-recovery device according to the present invention.

Referring to the FIGS., an energy recovery device 10 according to the present invention is illustrated for use with a work-load system 12 shown schematically in FIG. 1. The work-load system 12 is representative of any system wherein the reactive load forces generated in opposition to an input force applied to the work-load system 12 increase with increasing displacement of the work-load system 12 or a component thereof.

Although reference is made herein to surfaces and orientations of various components of the energy recovery device 10, such reference is simply for purposes of illustration and is not intended as a limitation of the energy recovery device 10 according to the present invention.

Figure 2:
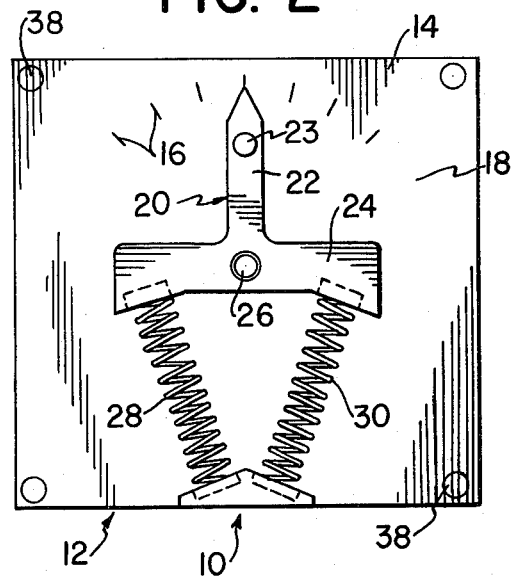
FIG. 2 is a front view of the work-load system of FIG. 1.

The work-load system 12 shown in FIGS. 1 and 2 includes a plate 14 having indicia markings 16 on a face 18 thereon. A lever 20 including arm 22, a lever pin 23, and cross bar member 24 is pivotally secured to a central shaft 26 extending from the face 18 of plate 14. Each end of the cross bar member 24 is secured in contacting engagement with spring members 28 and 30 which produce a reactive or resistance force upon the rotational displacement of the arm 22 by means of an input force applied to lever pin 23.

The lever 20 typically is used to control a work-load system which is shown schematically in FIGS. 1 and 2 by the dual compression spring arrangement 28, 30 which offers resistance to movement of the lever 20 off the center-line or neutral, i.e., vertical, position indicated by the indicia 16. Moreover, as the lever 20 is increasingly displaced from its neutral position, the resistance offered by the spring arrangement 28, 30 also increases. An example of such a work-load system involves a hydraulic control system for an elevator on an airplane.

Figure 3:
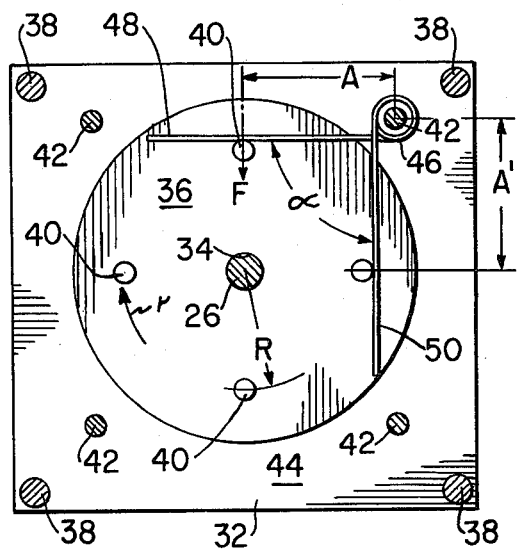
FIG. 3 is a front view of the energy recovery device in a neutral state taken along line 3—3 of FIG. 1.

Referring to FIGS. 1 and 3, one embodiment of an energy recovery device 10 according to the present invention is shown in a neutral position including a housing 32 having an aperture 34 through which the central shaft 26 passes and is axially secured to a disk 36. Therefore, any rotational movement of the lever 20 about the central shaft 26 will be transferred to disk 36 which in turn will also turn with the central shaft 26. The housing 32 is separated from the plate 14 by spacers 38 and is thereby kept stationary relative to plate 14. The disk 36 has four pins or contact posts 40 positioned on the periphery of disk 36 equidistantly and symmetrically about the central shaft 26. Also, four pins or support posts 42 extend from the face 44 of housing 32 adjacent the periphery of the disk 36 and are themselves positioned equidistantly and symmetrically about the central shaft 26. Each support post 42 serves as a hub for supporting a helically coiled torsion spring 46 only one of which is shown for sake of simplicity in FIG. 3. The torsion spring 46 has two legs 48 and 50 which are arranged as shown in FIG. 3 to contact a pair of adjacent successive contact posts 40 so as to maintain the torsion spring 46 in a compressed state. Additional torsion springs 46 as desired can be likewise arranged on other support posts 42 and have their respective legs 48 and 50 contacting a pair of adjacent successive contact posts 40. In this fashion, each torsion spring 46 can be wound up to its maximum stored energy state.

In operation, the arm 22 of lever 20 initially is in an upright or vertical position. In this neutral or initial state, the reactive or load forces generated by the springs 28, 30 is zero and no forces are transferred to the disk 36. However, upon the application of an input force to arm 22, the cross bar member 24 descends upon the respective spring either 28 or 30 which in turn generates a load force opposing the movement of the arm 22. The disk 36 originally is oriented so that the four contact posts 40 are positioned as shown in FIG. 3 and correspond to the neutral or upright position of arm 22. In this position, the legs 48 and 50 are separated by an angle and have equal arm lengths A and A' respectively as determined between the support post 42 and the respective contact post 40. Since in this position, the forces exerted by the legs 48 and 50 on their respective contact posts 40 are of equal magnitude by virtue of the symmetry of design, there is no net torque produced about the central shaft 26. Arm lengths A and A' for each spring 46 are always equal when the arm 22 is in a neutral position. In the neutral state, legs 48 and 50 form an angle $\alpha$ as shown in FIG. 3.

Although FIG. 3 illustrates 90° as a spacing between the two successive contact posts 40, the symmetrical disposition of these posts at any convenient angle of separation determines the force balanced condition which characterizes the neutral position of the system. Arm lengths A and A' at this point are always equal.

Figure 4:
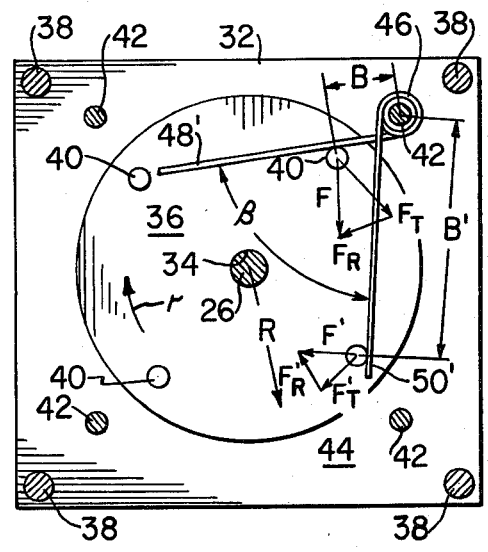
FIG. 4 is a view of the energy recovery device of FIG. 3 displaced from the neutral state.

Upon application of an input force to the lever pin 23, the central shaft 26 will rotate and thereby rotate disk 36 accordingly in direction of arrow "r". As a result, the contact posts 40 engaging legs 48 and 50 will rotate about the central shaft 26 such that the angle between the legs 48' and 50' now positioned as shown in FIG. 4 is reduced to an angle $\beta$ which is less than $\alpha$. Additionally, the length of leg 48' identified as B in FIG. 4 decreases while the length of leg 50' identified as B' increases.

The reduction in the angle $\alpha$ means that energy from the coiled torsion spring 46 has been delivered through contact posts 40 and disk 36 to impart a torque to central shaft 26 in the direction of its rotation "r". The vector diagrams drawn in FIG. 4 at successive contact posts 40 illustrate that a net tangential force $F_T$ and $F'_T$ exist at radius arm R about central shaft 26 and that the torque so developed urges disk 36 to rotate in the direction of arrow "r". The force vector F in FIG. 4 at one of the contact posts 40, representing the applied force of spring arm 48 against that post, is delivered at the reduced arm length B from the center of the torsion spring. Since torque in a helically coiled torsion spring equals force times arm length, therefore the force delivered has increased at shorter lever arm B, offset only partially by the drop in the torque output of the torsion spring 46 unwinding from angle $\alpha$ to angle $\beta$. Although the reverse is true at the contact post 40 where arm B' is greater than A' (FIG. 3), a net tangential force $F'_T$ still exists. The resultant of forces F and F' in FIG. 4 is such that a net torque exists about central shaft 26. By selective positioning of the support post 42 and varying of arm length R for a given angular displacement of the work-load system, a wide spectrum of torque versus angle of rotation may be achieved to provide desired system characteristics. Proportions chosen in FIGS. 3 and 4 are by way of illustration and are not to be taken as limiting the present invention. The embodiment of the present invention illustrated in FIGS. 3 and 4 demonstrates how torque is delivered by the unwinding of torsion spring 46 for the right hand rotation of central shaft 26.

Preferably, the support posts 42 and contact posts 40 are positioned such that a net torque is developed about the central shaft 26 which is approximately equal to and opposite in direction to the reactive load forces generated by either spring 28 or 30 so as to counteract and balance the reactive load forces. In this fashion, once the lever 20 is displaced, the energy recovery device 10 permits the lever 20 to remain in its displaced state without maintainance of an input force on lever 20. In addition, the energy recovery device 10 permits the continued displacement of the lever 20 with a negligible input force.

Hence, the energy recovery device 10 provides for reversing the action of a torsion spring 46 so as to be able to counteract and preferably balance reactive load forces generated in a work-load system 12. The number of torsion springs 46 is determined in accordance with the magnitude of the reactive forces to be counteracted and balanced. Alternatively, it may be desirable that the energy recovery device 10 be capable of producing recovery forces or a net torque which is only a portion of the maximum magnitude of the reactive loads produced by the work-load system.

In the work-load system 12 illustrated in FIG. 1, the lever 20 can be actuated from the neutral vertical position in either direction. The symmetry of the work-load system as illustrated in the FIGS. provides that the same result as described above obtains in either direction.

The maximum permissible angle of rotation for disk 36 is limited geometrically to a fraction of a turn in either direction of rotation. For work-load systems requiring a greater angle of rotation at the output member, a system of gearing or levers can be interposed between disk 36 and the final output shaft that will amplify the swing arc of disk 36 by the desired amount.

In FIGS. 3 and 4 only one torsion spring 46 has been illustrated for the sake of simplicity of description of operation. A multiplicity of coiled torsion springs 46 can be disposed about disk 36, each having legs 48, 50 engaging a successive adjacent pair of posts 40. The advantage of a multiple spring system is in the additive effect, which permits greater energy storage in a given space and provides a more favourable distribution of bearing loads on the output central shaft 26. However, the 2 or 4 spring arrangements are preferred.

Although the torsion spring 46 has been described in a particular arrangement relative to the disk 36, this arrangement is purely representative of one embodiment and is not to be taken as limiting the present invention. Alternatively, the torsion spring 46 can be positioned so that only leg 48 contacts a contact post 40, leg 50 being shortened and secured directly to the housing 32 or the support post 42. In this instance, at least one other torsion spring 46 having only a leg 50 contacting a contact post 40 will be required to initially balance the force generated by the aforementioned leg 48 of the first torsion spring 46. In this manner, various arrangements and combinations of torsion springs 46 can be employed. In another alternative embodiment, compression springs can be utilized to replace the torsion springs described above. In particular, the legs 48 and 50 can be replaced by compression springs connected at their one end to a contact post 40 and at their other end to a support post 42.

Figure 5:
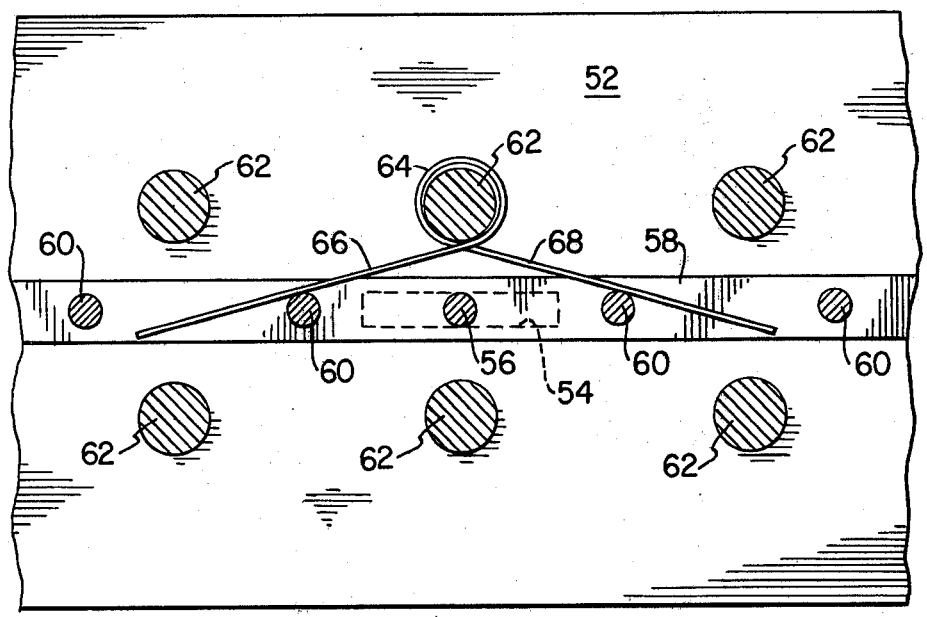
FIG. 5 a view of a second embodiment of the energy recovery device according to the present invention.

Referring to FIG. 5, a second embodiment is shown for use with a work-load system (not shown) which produces reactive load forces operating in a linear direction. The second embodiment includes a housing 52 having a horizontal slot 54 to accomodate the longitudinal movement of a central shaft 56 secured to a rectangular plate 58. The central shaft 56 is also coupled to the work-load system such that the linear reactive load forces can operate to displace the rectangular plate 58 in either direction along the longitudinal axis of rectangular plate 58.

Similarly as with the rotary embodiment described above, a pair of contact posts 60 extend from the surface of rectangular plate 58 and are spaced apart symmetrically about the central shaft 56. Above the rectangular plate 58, a support post 62 is spaced at a given distance above the central shaft 56 as well as the longitudinal axis of the rectangular plate 58. A helically coiled torsion spring 64 is secured to the support post 62. The torsion spring 64 has two legs 66 and 68 which as shown in FIG. 5 are arranged to contact a pair of adjacent successive contact posts 60 so as to maintain the torsion spring 64 in a compressed state.

The operation of the embodiment of the energy recovery device 10 shown in FIG. 5 is similar to that of the first embodiment. Initially, the forces generated by the legs 66 and 68 of the torsion spring 64 balance each other when the work-load system is in a neutral state. In the neutral state, the lengths of the legs 66 and 68 as determined between the support post 62 and the contact posts 60 will be equal. Upon the application of a linear input force to the work-load system, the central shaft 56 together with rectangular plate 58 will be displaced in either direction along the longitudinal axis of the rectangular plate 58 in accordance with the direction of the input or driving force. As a consequence, one of the legs 66 or 68 will become shorter and the force generated by that leg will increase over that force generated by the other and now longer leg. In this manner a net force is generated in opposition to any reactive load forces which are preferably balanced by the net force.

Any number of torsion springs 64 together with their respective support posts 62 and contact posts 60 can be provided as shown in FIG. 5. The contact posts 60 and support posts 62 are equally spaced apart and are symmetrically arranged about the central shaft 56. Also the support posts 62 are equally spaced above the rectangular plate 58. Additional support posts 62 and respective torsion springs 64 can be positioned below the rectangular plate 58. Also as described above, various arrangements and configurations of torsion springs 64 can be utilized, e.g., only one of the legs 66 or 68 can be employed to engage a contact post 60 while the other is secured to the housing 52 or support post 62. Moreover, if desired, other force generating mechanisms can be employed, e.g., compression springs to replace the legs 66 and 68 of the torsion spring 64.

Thus, the energy recovery device 10 of the present invention provides for the storage and retrival of energy during the displacement of a work-load system under an input force. During displacement of the work-load system from its neutral state, the device 10 transfers energy so as to aid in that displacement; and during displacement of the work-load system toward the neutral state, the device 10 stores energy derived from the work-load system by means of the reactive forces. Preferably, the force generating mechanisms of the energy recovery device 10 are configured and arranged so that at any given displacement of the work-load system from the neutral position, the recovery forces generated by the energy recovery device 10 are in opposition to and counterbalance the work-load forces. Therefore, the work-load system will remain at a given displacement when the driving or input force applied to the work-load system is removed. Moreover, the counterbalancing of forces permits continued displacement of the work-load system with a minimal and constant driving force.

I claim:

1. A device for storage and retrieval of energy during displacement of a work-load system under an input force, the work-load system generating load forces increasing in correspondence with increased displacement of the work-load system from a neutral state wherein the load forces are approximately zero, comprising:
   a. plate means;
   b. first means for transferring the load forces generated by the work-load system to the plate means so as to provide displacement of the plate means in accordance with the load forces;
   c. energy storage means capable of generating forces in opposition to the load forces; and
   d. second means for transferring the forces generated by the energy storage means to the plate means generally continuously in opposition to the load forces transferred to the plate means so as to aid in the displacement of the work-load system from its neutral state, and for transferring the load forces generated by the work-load system to the energy storage means for storage generally continuously during displacement of the work-load system toward its neutral state.

2. A device for storage and retrieval of energy during displacement of a work-load system under an input force, the work-load system generating load forces increasing in correspondence with increased displacement of the work-load system from a neutral state wherein the load forces are approximately zero, comprising:
   a. plate means;
   b. first means for transferring the load forces generated by the work-load system to the plate means so as to provide displacement of the plate means in accordance with the load forces;
   c. energy storage means capable of generating forces in opposition to the load forces; and
   d. second means for transferring the forces generated by the energy storage means to the plate means generally continuously in opposition to the load forces transferred to the plate means to generally counteract the load forces so as to aid in the displacement of the work-load system from its neutral state with a substantially negligible input force and to allow the work-load system to remain displaced from the neutral state upon any predetermined displacement, and for transferring the load forces generated by the work-load system to the energy storage means for storage generally continuously during displacement of the work-load system toward its neutral state.

3. A device for storage and retrieval of energy during displacement of a work-load system under an input force, the work-load system generating load forces increasing in correspondence with increased displacement of the work-load system from a neutral state wherein the load forces are approximately zero, comprising:
   a. plate member;
   b. first means for transferring the load forces generated by the work-load system to the plate member so as to provide displacement of the plate member in accordance with the load forces;
   c. at least one torsion spring capable of being placed under tension and being dimensioned and configured for generating forces in opposition to the load forces; and
   d. second means for transferring the forces generated by the torsion spring when placed under tension to the plate member generally continuously in opposition to the load forces transferred to the plate member to generally counteract the load forces so as to aid in the displacement of the work-load system from its neutral state with a substantially negligible input force and to allow the work-load system to remain displaced from the neutral state upon any predetermined displacement, and for transferring the load forces generated by the work-load system to the energy storage means for storage generally continuously during displacement of the work-load system toward its neutral state.

4. The device according to claim 3 wherein the plate member is generally a disk having at least one surface and a rod-like member extending through a central portion of the disk.

5. The device according to claim 4 wherein the first transferring means is coupled to the rod-like member so as to rotationally transfer the load forces to the plate member such that the load forces are transferred to the plate member as a torque about the rod-like member.

6. The device according to claim 5 wherein the disk has a plurality of contact posts extending from the surface of the disk and being disposed adjacent the periphery of the disk and symmetrically about the rod-like member.

7. The device according to claim 6 wherein the second transferring means comprises a housing for rotationally securing the disk thereto, the housing having at least one surface oriented in the direction of the disk surface and having an aperture into which the rod-like member extends.

8. The device according to claim 7 wherein the housing further includes a plurality of support posts extending from the housing surface generally parallel to the rod-like member, said support posts being disposed adjacent the periphery of the disk and symmetrically about the rod-like member.

9. The device according to claim 8 including a plurality of torsion springs corresponding in number to the plurality of support posts, each of said torsion springs being secured to at least one of said support posts.

10. The device according to claim 3 wherein the plate member is a generally rectangular member having at least one surface and a rod-like member extending through a central portion of the rectangular member.

11. The device according to claim 10 wherein the first transferring means is coupled to the rod-like member so as to linearly transfer the load forces to the rectangular member along its longitudinal axis such that the load forces are transferred to the rectangular member as longitudinal forces.

12. The device according to claim 11 wherein the rectangular member has a plurality of contact posts extending from the surface of the rectangular member along the longitudinal axis of the rectangular member and being spaced symmetrically about the rod-like member.

13. A device for storage and retrieval of energy during displacement of a work-load system under an input force, the work-load system generating load forces increasing in correspondence with increased displacement of the work-load system from a neutral state wherein the load forces are approximately zero, comprising:

a. plate member being generally a disk having at least one surface and a rod-like member extending through a central portion of the disk, said disk having a plurality of contact posts extending from the surface of the disk and being disposed adjacent the periphery of said disk and symmetrically about the rod-like member;
   b. first means for transferring the load forces generated by the work-load system to the plate member so as to provide displacement of the plate member in accordance with the load forces, said first transferring means being coupled to the rod-like member so as to rotationally transfer the load forces to the plate member such that the load forces are transferred to the plate member as a torque about the rod-like member;
   c. a plurality of torsion springs capable of being placed under tension and being dimensioned and configured for generating forces in opposition to the load forces; and
   d. second means for transferring the forces generated by said torsion springs when placed under tension to the plate member to generally counteract the load forces so as to aid in the displacement of the work-load system from its neutral state with a substantially negligible input force and to allow the work-load system to remain displaced from the neutral state upon any predetermined displacement, and for transferring the load forces generated by the work-load system to the energy storage means for storage during displacement of the work-load system toward its neutral state, said second transferring means including a housing for rotationally securing the disk thereto, the housing having at least one surface oriented in the direction of the disk surface and having an aperture into which the rod-like member extends, wherein the housing further includes a plurality of support posts extending from the housing surface generally parallel to the rod-like member, said support posts being disposed adjacent the periphery of the disk and symmetrically about the rod-like member, said plurality of support posts corresponding in number to the plurality of torsion springs, each of said torsion springs being secured to at least one of said support posts, wherein each of the torsion springs has a pair of legs, each pair of said legs being placed in contacting engagement with a respective adjacent successive pair of contact posts on the disk such that upon rotational movement of the disk the length of one of said legs from the support post to the contact post decreases while the corresponding length of the other of said legs increases so as to create a spring force about the rod-like member, the resultant of the spring forces being approximately equal to the load forces transferred to the plate member so as to counteract and balance the load forces.

14. A device for storage and retrieval of energy during displacement of a work-load system under an input force, the work-load system generating load forces increasing in correspondence with increased displacement of the work-load system from a neutral state wherein the load forces are approximately zero, comprising:

a. plate member being a generally rectangular member having at least one surface and a rod-like member extending through a central portion of the rectangular member, the rectangular member having a plurality of contact posts extending from the surface of the rectangular member along the longitudinal axis of the rectangular member and being spaced symmetrically about the rod-like member;
   b. first means for transferring the load forces generated by the work-load system to the plate member so as to provide displacement of the plate member in accordance with the load forces, the first transferring means being coupled to the rod-like member so as to linearly transfer the load forces to the rectangular member along its longitudinal axis such that the load forces are transferred to the rectangular member as longitudinal forces;
   c. at least one torsion spring capable of being placed under tension and being dimensioned and configured for generating forces in opposition to the load forces; and
   d. second means for transferring the forces generated by the torsion spring when placed under tension to the plate member to generally counteract the load forces so as to aid in the displacement of the work-load system from its neutral state with a substantially negligible input force and to allow the work-load system to remain displaced from the neutral state upon any predetermined displacement, and for transferring the load forces generated by the work-load system to the energy storage means for storage during displacement of the work-load system toward its neutral state, wherein the second transferring means comprises a housing for securing the rectangular member thereto, the housing having at least one surface oriented in the direction of the surface of the rectangular member and having a longitudinal slot aligned with the axis thereof into which the rod-like member extends for longitudinal movement therein.

15. The device according to claim 14 wherein the housing further includes a plurality of support posts extending from the housing surface generally parallel to the rod-like member, said support posts being disposed adjacent the periphery of the rectangular member and symmetrically about the rod-like member.

16. The device according to claim 15 including a plurality of torsion springs corresponding in number to the plurality of support posts, each of said torsion springs being secured to one of said support posts.

17. The device according to claim 16 wherein each of the torsion springs has a pair of legs, each pair of said legs being placed in contacting engagement with a respective adjacent successive pair of contact posts on the rectangular member such that upon longitudinal movement of the rectangular member the length of one of said legs from the support post to the contact post decreases while the corresponding length of the other of said legs increases so as to create a spring force about the rod-like member, the resultant of the spring forces generated by the plurality of torsion springs being approximately equal to the load forces transferred to the plate member so as to counteract and balance the load forces.

* * * * *